United States Patent [19]

Ozawa et al.

[11] Patent Number: 4,694,502
[45] Date of Patent: Sep. 15, 1987

[54] COLOR IMAGE READING APPARATUS

[75] Inventors: Kunitaka Ozawa, Tokyo; Naoki Ayata, Machida; Hidetoshi Suzuki, Tokyo; Seiji Saito, Yokosuka; Noboru Koumura, Narashino, all of Japan

[73] Assignee: Canon Kabushiki Kaisha, Tokyo, Japan

[21] Appl. No.: 842,763

[22] Filed: Mar. 21, 1986

Related U.S. Application Data

[63] Continuation of Ser. No. 380,461, May 20, 1982, abandoned.

[30] Foreign Application Priority Data

| Jun. 1, 1981 | [JP] | Japan | 56-84714 |
| Jul. 17, 1981 | [JP] | Japan | 56-112660 |
| Oct. 8, 1981 | [JP] | Japan | 56-159387 |
| Oct. 8, 1981 | [JP] | Japan | 56-159388 |
| Oct. 9, 1981 | [JP] | Japan | 56-160151 |
| Oct. 9, 1981 | [JP] | Japan | 56-160152 |
| Oct. 9, 1981 | [JP] | Japan | 56-160153 |
| Oct. 9, 1981 | [JP] | Japan | 56-160154 |

[51] Int. Cl.$^4$ .................................................. G06K 9/20
[52] U.S. Cl. ................................... 382/17; 250/226; 358/80; 382/58
[58] Field of Search ................. 382/17, 58; 250/226; 358/22, 26, 27, 29, 80, 316–318, 75, 78; 356/303, 402, 405–407, 416; 355/4, 32, 88; 364/526

[56] References Cited

U.S. PATENT DOCUMENTS

| 3,809,892 | 5/1974 | Schober | 250/226 |
| 3,827,804 | 8/1974 | Miller et al. | 382/17 |
| 3,885,244 | 5/1975 | Keller | 358/80 |
| 3,904,872 | 9/1975 | Ebukuro et al. | 250/226 |
| 4,127,871 | 11/1978 | Sakamoto | 358/80 |
| 4,198,652 | 4/1980 | Parker | 358/27 |
| 4,307,415 | 12/1981 | Sundermeyer et al. | 358/80 |
| 4,335,398 | 6/1982 | Yamada | 358/80 |
| 4,349,279 | 9/1982 | Jung | 358/80 |
| 4,467,348 | 8/1984 | Fujii et al. | 358/78 |
| 4,479,242 | 10/1984 | Kurata | 382/17 |

Primary Examiner—Leo H. Boudreau
Attorney, Agent, or Firm—Fitzpatrick, Cella, Harper & Scinto

[57] ABSTRACT

A multi-color image reading device is described in which plural photoelectric converting means convert the light beam from an original color image into electrical color separation signals, a color identification means produces plural color signals corresponding to colors of the multi-color image according to the plural color separation signals, and correcting means utilizes a particular color signal for correcting other color signals.

7 Claims, 25 Drawing Figures

COLOR IMAGE READING APPARATUS

This application is a continuation of application Ser. No. 380,461 filed May 20, 1982, now abandoned.

BACKGROUND OF THE INVENTION

1. Field of the Invention

The present invention relates to an image reading apparatus for reading an original image with an image sensor such as a charge-coupled device, and more particularly to a color image reading apparatus capable of identifying the colors of a multi-color image.

2. Description of the Prior Art

In recent years there have been proposed image processing apparatus for converting image information into electrical signals by means of an image sensor such as a charge-coupled device and conducting image processing such as image recording in response to said electrical image signals.

Some of such apparatus are capable of also reading the color information of the image. Color information is generally obtained by reading plural different colors by means of filters respectively transmitting mutually different colors or by means of a member capable of classifying the light according to the wavelength thereof and processing thus obtained image signals corresponding to plural colors.

The function of such multi-color reading apparatus will be understood from a black-red two-color reading apparatus shown as an example in FIG. 1—1, in which a light beam L from a light source 2 is reflected by an original 1, then reflected by a mirror 3, converged by a lens 5 and divided by a beam splitter 6 composed for example of a dichroic mirror into a longer-wavelength beam LR and a shorter-wavelength beam LB, which are respectively focused onto self-scanning photoelectric sensors 7, 8 respectively for longer and shorter wavelength regions, composed of charge-coupled devices.

The electrical signals from said photoelectric sensors 7, 8 are respectively amplified by amplifiers Amp1, Amp2 to obtain a longer wavelength analog signal A1 and a shorter wavelength analog signal A2, which are respectively digitized by binary encoders BC1, BC2 with slicing levels Sl, S2 to obtain a longer wavelength digital signal B1 and a shorter wavelength digital signal B2. Said digital signals are subsequently processed in a color identifying circuit DV to obtain a black signal C1 and a red signal C2. FIG. 1-2 shows the ideal waveforms of various signals obtainable by scanning in the X-direction of an original having a black image area KI and a red image area RI.

In practice, however, as shown in FIGS. 2-1 and 2—2, there may result an erroneous signal G in a color, for example red in this case, over a period of several pixels in the principal scanning direction X corresponding to an edge E of the other color, for example black in this case, due to an aberration in the positional adjustment of two photoelectric sensors or the lens focusing. Such a defect may also arise in the auxiliary scanning direction. Such a defect can only be avoided extremely tedious mechanical adjustment which has to be repeated quite frequently.

In ordinary originals such as documents, three colors, i.e. black, red and blue, are most frequently encountered and considered important. In order to identify these three colors there have been proposed image reading apparatus as shown in FIGS. 3 and 4. In FIG. 3, an original 1 is illuminated by a light source 2, and a reflected light beam L is guided through a mirror 3, an infrared absorbing filter 4 and a focusing lens 5 to a beam splitter 6 composed for example of a dichroic mirror, which reflects a longer-wavelength red light LR while transmits a shorter-wavelength blue light LB. Said lights are respectively guided to photoelectric sensors 7, 8, composed for example of charge-coupled devices, which respectively convert the red light image and blue light image into corresponding electrical signals. The image signals SR, SB thus obtained are released from the photoelectric sensors 7, 8 sequentially in response to clock pulses from an unrepresented clock generator and supplied to a color identifying circuit 9. FIG. 4 shows a conventional example of such a color identifying circuit 9, in which said image signals SR, SB are respectively amplified by amplifiers 11, 12, and transmitted through clamp circuits 13, 14 and voltage followers 15, 16 to provide image signals SR1, SB1, which are then converted into digital signals DSR, DSB by binary encoders 17, 18 with determined slicing levels. Said digital signals DSR, DSB are decoded into a red signal R, a black signal BK, a blue signal B and a white signal W by logic processing in a decoder 19, composed of inverters 20–23 and AND gates 24–27.

Tab. 1 and FIGS. 5, 5A and 5B show examples of actually measured values of the image signals SR1, SB1 supplied to the digital encoders 17, 18.

TABLE 1

|  | Red | Black | Blue | White |
| --- | --- | --- | --- | --- |
| SR1 | 670 mV | 130 mV | 380 mV | 1050 mV |
| SB1 | 290 mV | 190 mV | 980 mV | 1330 mV |

According to the above-mentioned figures, it is possible to identify different colors by digitizing the analog signals SR1, SB1 with slicing levels of 550 mV and 640 mV respectively. Tab. 2 shows the digital signals DSR, DSB respectively obtainable from the signals SR1, SB1 accordingly and the corresponding color identification.

TABLE 2

| DSR | DSB | Color identified |
| --- | --- | --- |
| H | H | White |
| H | L | Red |
| L | H | Blue |
| L | L | Black |

In such method, however, the signal SR1 for example has an output ratio limited to 670 : 380≃2 : 1 with a voltage difference only equal to 290 mV for red and blue and may mistake red for black or blue for white due to the possible fluctuation in the output signals caused for example by noise, as the slicing level has to be determined rather delicately.

As explained in the foregoing, the conventional color reading apparatus are incapable of exact color identification because of the difference in the reading levels resulting from uneven spectral sensitivity of the photoelectric sensors. In the reproduced image, therefore, such a defect gives rise to an undesired red toning in the edge or continuous tone area of a black image area, or to an image in which red is reproduced too weakly or black and blue are reproduced too strongly.

SUMMARY OF THE INVENTION

In consideration of the foregoing, the object of the present invention is to provide a multi-color image reading apparatus capable of exact color identification.

Another object of the present invention is to provide a multi-color image reading apparatus capable of providing color signals in which unnecessary signals are eliminated after color identification.

Still another object of the present invention is to provide a multi-color image reading apparatus capable of preventing errors in the color identifying function caused by external noise.

Still another object of the present invention is to provide a multi-color image reading apparatus capable of providing color signals independently regulated for respective colors.

The foregoing and still other objects and advantages of the present invention will become apparent from the following description.

BRIEF DESCRIPTION OF THE DRAWINGS

FIGS. 2-1 and 2-2 are waveform charts including erroneous signals caused by aberrations in the positional adjustment of the photoelectric sensors or in the lens focusing;

DESCRIPTION OF THE PREFERRED EMBODIMENTS

Now the multi-color image reading apparatus of the present invention will be clarified in detail by an embodiment thereof shown in the attached drawings.

Figure 1:
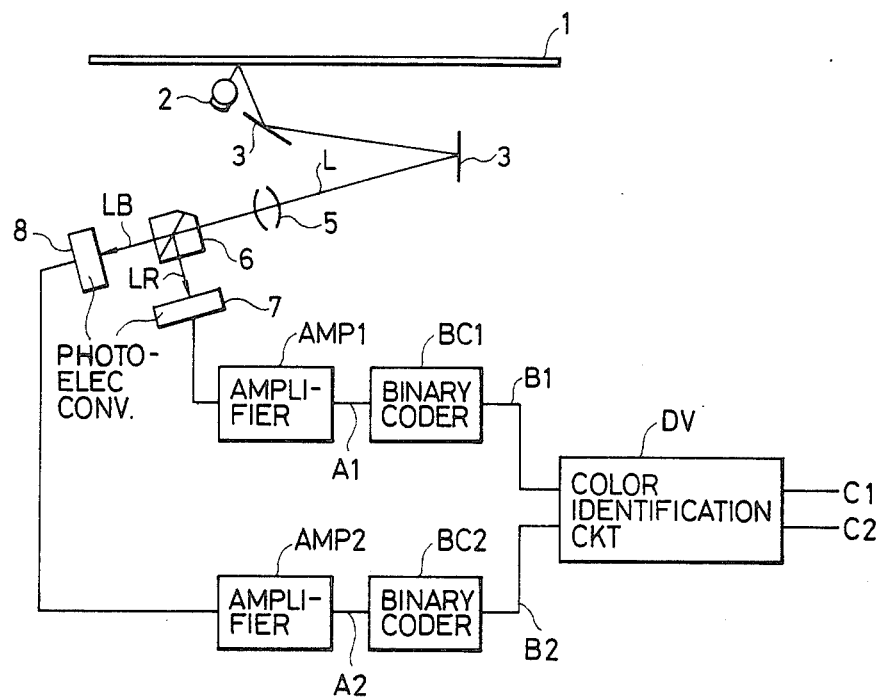
FIGS. 1-1 and 1-2 are respectively a schematic view and a corresponding waveform chart of a conventional black-red two-color image reading apparatus.
Figures 1, 2:
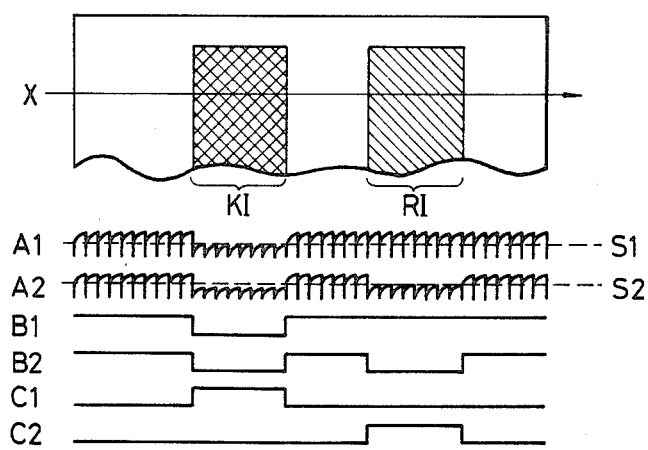
Figures 1, 2:
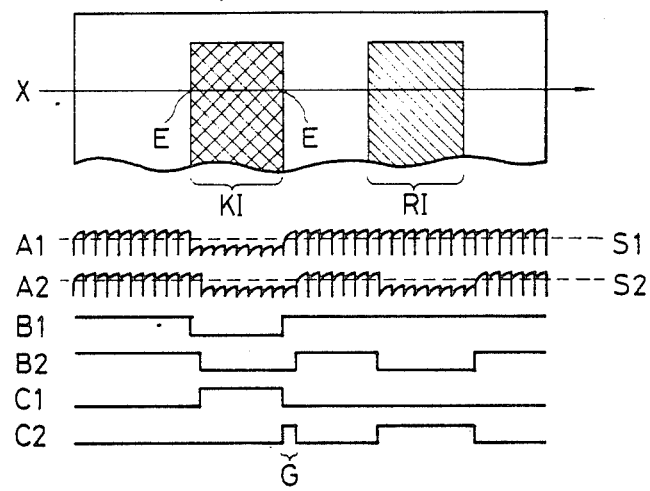
Figure 2:
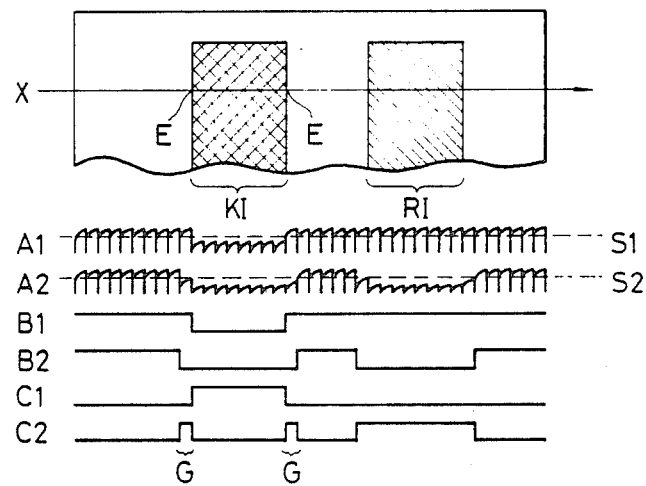
Figure 6:
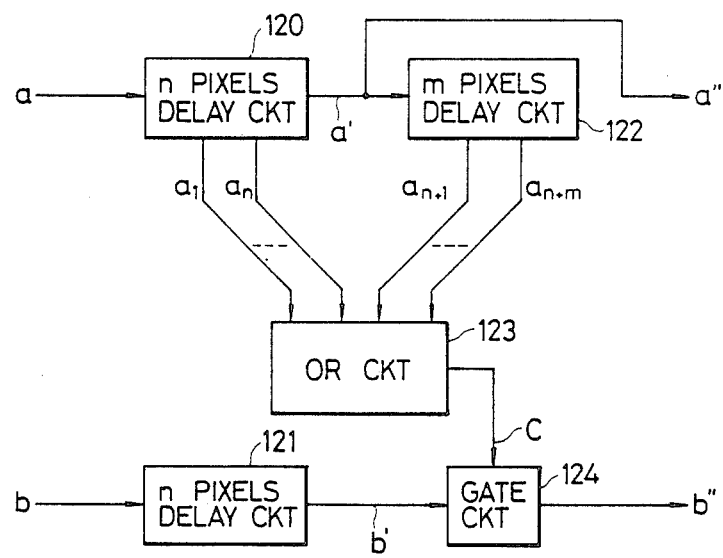
FIG. 6 is a block diagram for correction control in the principal scanning direction to be employed in an embodiment of the present invention.
Figure 7:
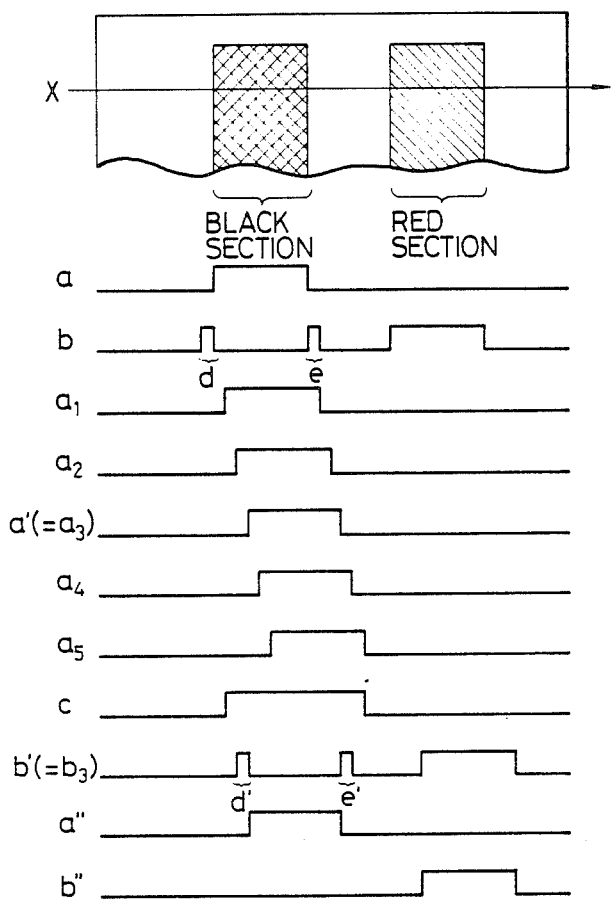
FIG. 7 is a waveform chart showing the function of the circuit shown in FIG. 6.

FIG. 6 shows a circuit for correcting the color signals in the principal scanning direction, said signals being obtained from photoelectric sensors of a black-red two-color image reading apparatus. The symbols a and b correspond respectively to the black signal C1 and red signal C2 supplied from the black-red identifying circuit DV shown in FIG. 1. There are provided a black signal delaying circuit 120 for a period corresponding to n pixels, a red signal delaying circuit 121 for a period corresponding to n pixels, a black signal delaying circuit 122 for a period corresponding to m pixels, an OR gate 123, and a gate circuit 124. In the illustrated embodiment it is assumed that $n=3$ and $m=2$. The various signals in the circuit of FIG. 6 are shown in FIG. 7, in which d and e represent erroneous signals.

Said delaying circuits 120, 122 delay the black signal a to provide a 1-pixel delayed signal a1, a 2-pixel delayed signal a2, . . . , a 5-pixel delayed signal a5.

Said signals a1–a5 are supplied to the OR gate 123 to provide a signal c. Also the red signal b is delayed by the delaying circuit 121 of n pixels to provide a signal b'. The gate circuit 124 is so constructed as to intercept the H-level signal b' while the signal c remains at the H-level. Consequently the red signal b is always reduced to the L-level within two pixels before and after the H-level period of the black signal a. In this manner the red signal b containing erroneous signals d, e is corrected to a red signal b" free from such erroneous signals.

In the foregoing explanation it is assumed that $n>0$ and $m>0$, but it is also possible to select n or m equal to zero by eliminating the corresponding delaying circuit, thereby conducting red signal correction only before or after the change in the output level in the black signal.

Figure 8:
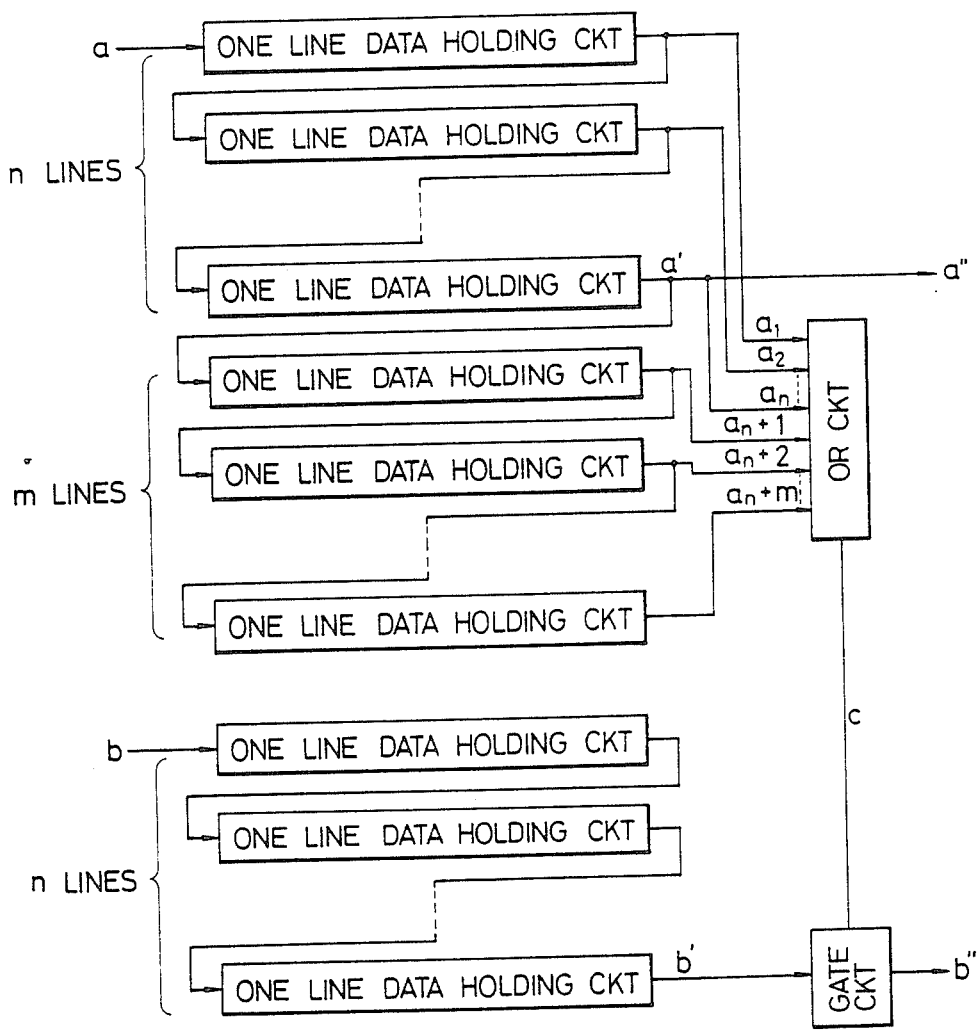
FIG. 8 is a block diagram of a control circuit for correction in the auxiliary scanning direction.

FIG. 8 shows a control circuit for correcting the color signal b by means of the color signal a in the so-called auxiliary scanning direction perpendicular to the principal scanning direction of the photoelectric sensors. The elimination of error signals in the auxiliary scanning direction can be achieved in the same manner as in the principal scanning direction by a circuit, instead of that shown in FIG. 6, having $(2 \times n + m)$ data registers each holding the signal of a principal scanning line.

The corrections in the principal and auxiliary scanning directions can be achieved by combining the above-mentioned correcting circuit for the principal scanning direction and for the auxiliary scanning direction.

As explained in the foregoing, the image reading apparatus of the present invention is based on converting the light beam from an original image into electrical signals by means of plural photoelectric converting means, obtaining at least two color signals from the electrical signals obtained from said photoelectric converting means, and utilizing a particular color signal for correcting other color signals thereby achieving exact color identification. Consequently the present invention not only improves the reliability of the result through the erasure of the error signals but also facilitates the mechanical adjustment of the apparatus, thus alleviating the burden required for such adjustment.

Now there will be given another embodiment of the present invention capable of identifying black, red and blue.

Figure 3:
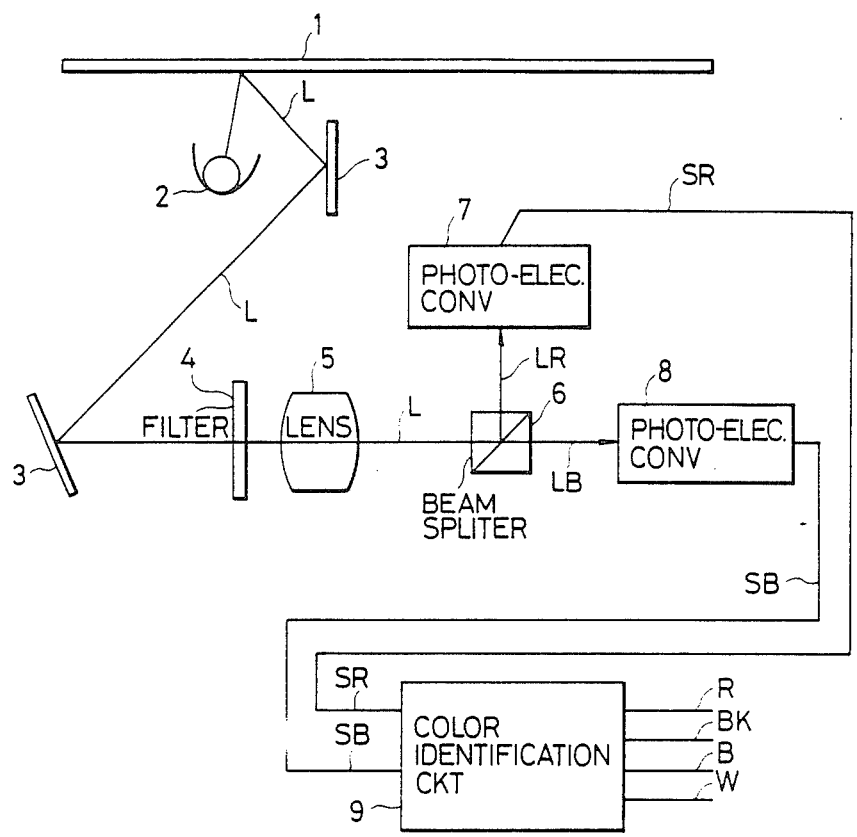
FIG. 3 is a schematic view of an image reading apparatus utilizing a conventional color identifying method.
Figure 4:
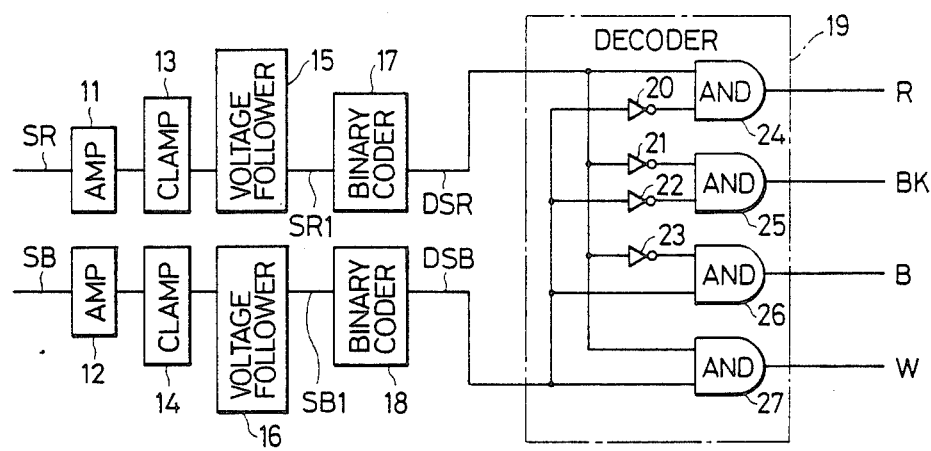
FIG. 4 is a block diagram of a color identifying circuit employed in the apparatus shown in FIG. 3.
Figure 9:
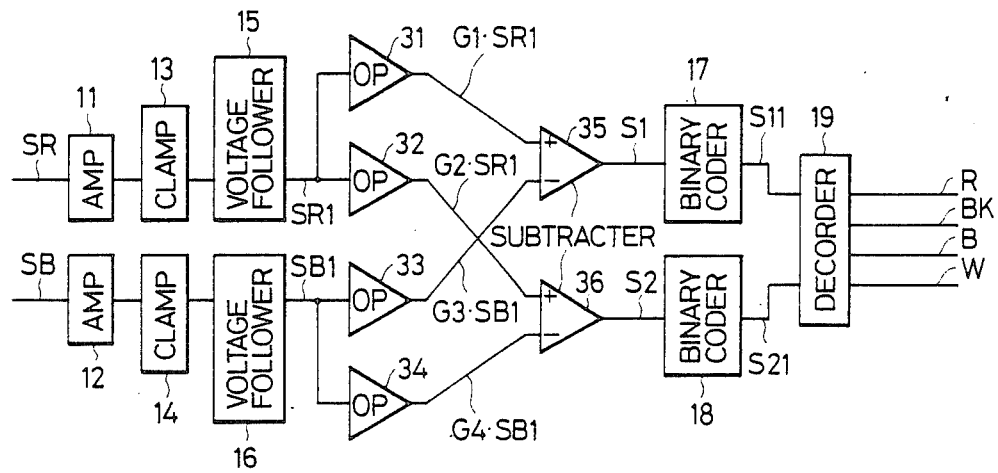
FIG. 9 is a block diagram of a color identifying circuit embodying the present invention.

Reference is made to FIG. 9 showing a block diagram of a color identifying circuit to be employed in the circuit shown in FIG. 3. The symbols SR, SB represent plural color signals obtained in the image reading apparatus shown in FIG. 3. There are provided amplifiers 31–34 and subtracters 35, 36. Other components are similar to those already shown in FIGS. 3 and 4 and are therefore not explained further. In the illustrated circuit, the signals S1, S2 obtained from the subtracters 35, 36 are given by the following equations:

$$S1 = G1 \cdot SR1 - G3 \cdot SB1 \quad (1)$$

$$S2 = G2 \cdot SR1 - G4 \cdot SB1 \quad (2)$$

wherein G1–G4 are respective gains of said amplifiers 31–34.

Figure 10A:
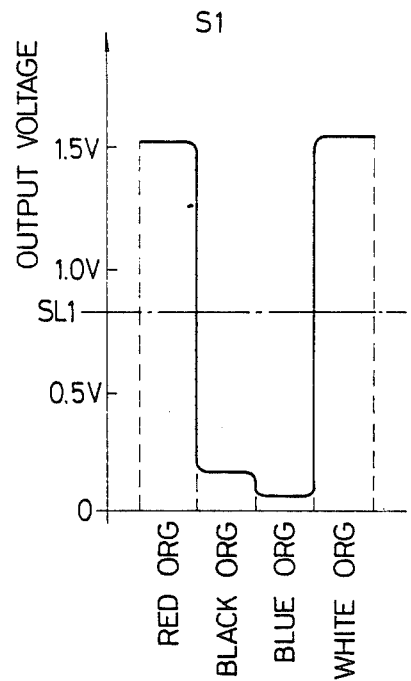
FIGS. 10A and 10B are charts showing the image signal levels after analog subtraction.
Figure 10B:
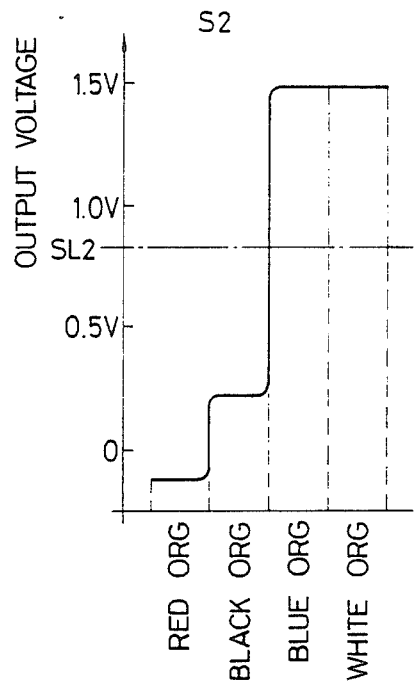

By selecting the gains G1–G4 in said equations (1) and (2) in the following manner:

$$G1 = 2.74, G2 = -1, G3 = 1, G4 = -1.91$$

the signals S1, S2 provide the following analog values for different colors as shown in Tab. 3 and in FIGS. 10A and 10B.

TABLE 3

|    | Red     | Black  | Blue    | White   |
|----|---------|--------|---------|---------|
| S1 | 1546 mV | 166 mV | 61 mV   | 1546 mV |
| S2 | −116 mV | 233 mV | 1492 mV | 1490 mV |

Figure 5A:
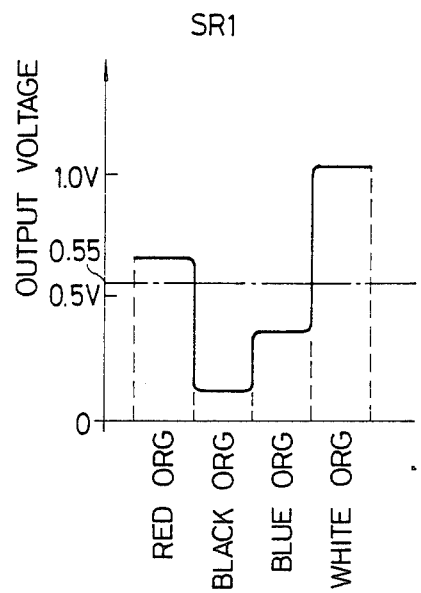
FIGS. 5A and 5B are charts showing image signals prior to analog subtraction in the circuit shown in FIG. 4.
Figure 5B:
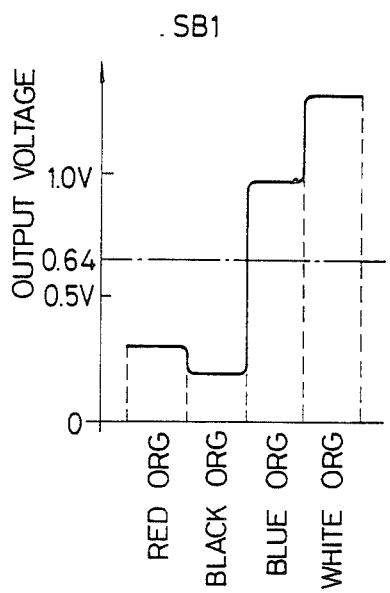

Comparison of Tab. 3 with Tab. 1 or of FIG. 10 with FIG. 5 clearly indicates that the signals S1 and S2 enable far easier selection of slicing levels for binary encoding than the aforementioned signals SR1 and SB1. Also the influence of noise is significantly reduced since the level ratio is at least 233 : 1492 = 1 : 6.4.

As explained in the foregoing, the present invention features obtaining plural color separation signals through color separation of a light beam from an original image, obtaining plural electrical signals with improved signal level ratios by logic processing between said plural color separation signals in a processing circuit, and further obtaining digital signals corresponding to different colors in the original image through a converting circuit.

In this manner an exact color identification is rendered possible by logic processing of the color separation signals prior to the color identification. An image recording of a high quality can thus be obtained, utilizing thus coloridentified signals.

Although analog processing is employed in the color identifying circuit of the present embodiment, it is naturally possible also to employ digital processing utilizing digital signals of plural bits.

Also the present embodiment is limited to the identification of red, black, blue and white colors, but the same principle is similarly applicable to other colors in combination with suitable color separating prisms or filters.

Furthermore, two charge-coupled devices are used in the present embodiment for obtaining two color-separated signals, but it is also possible to obtain two color-separated signals from a single charge-coupled device in combination with suitably changed filters.

Furthermore, the charge-coupled devices may be replaced by other photoelectric converting elements such as BBD or imaging tubes. In such case, however, there is required a memory element for storing the first color-separated signal.

Nevertheless, even with the above-discribed improved color identifying method, it is still impossible to independently control the densities of red, black and blue since the decoder 19 is commonly used for these colors. For example an adjustment of the red signal for enhancing the red color affects the identification of other colors.

Also in practice, as already explained in the foregoing, an erroneous signal of several pixels may emerge in a color, for example the red color signal, at the edge portions in the principal scanning direction of a particular color, for example the black color signal, due to an eventual aberration in the position adjustment of two photoelectric sensors or in the lens focusing. Such effect can also occur in the auxiliary scanning direction. As the result of such phenomenon, a black line may appear thinner than in the original image, or a thin black line may totally disappear. Such defect is quite difficult to prevent in practice since the mechanical adjustment required in the optical path has an extremely small tolerance, usually on the order of one micron.

Figure 11:
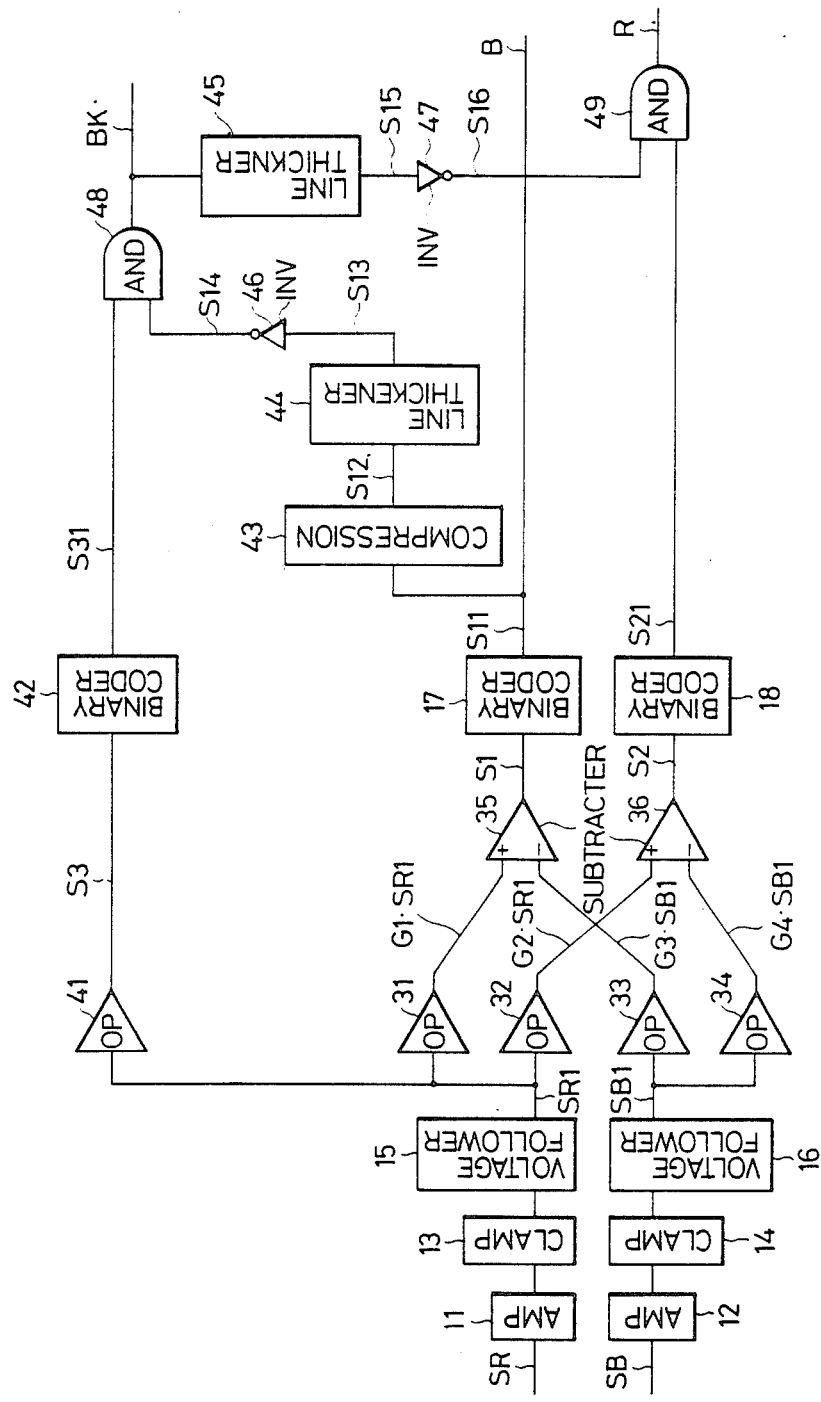
FIG. 11 is a block diagram of the color identifying circuit representing another embodiment of the present invention.

FIG. 11 shows another embodiment of the color identifying circuit 9 which is no longer associated with the above-mentioned drawbacks in the density control of the colors or resulting from positional aberration of the charge-coupled devices.

In FIG. 11 there are shown an amplifier 41, a binary encoder 42 such as a comparator, a noise reducing compressor 43 for eliminating small noises from digital signal S11, line thickening circuits 44, 45 for enlarging the pulse duration of the digital signal S12 or BK, inverters 46, 47 for inverting digital signals, and AND gates 48, 49, wherein subtracting circuits are composed of said inverters 46, 47 and AND gates 48, 49. The remaining part is essentially similar to the corresponding part shown in FIGS. 3 and 9 and is therefore omitted from the following description.

Figure 12:
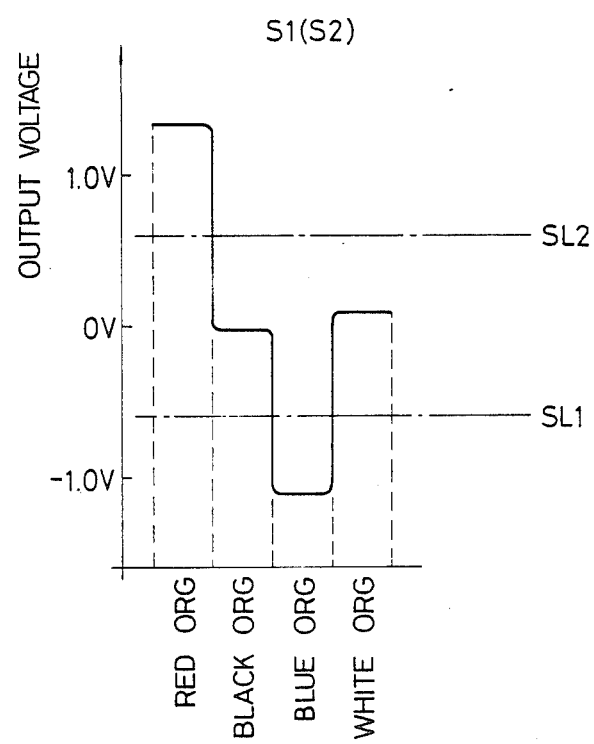
FIG. 12 is a chart showing image signal levels after the analog subtraction in the circuit shown in FIG. 11.

The present color identifying circuit functions in the following manner. By selecting the gains G1–G4 of the amplifiers 31–34 in the following manner:

$$G1 = G2 = 3.0, G3 = G4 = 2.3$$

the signals S1, S2 provide analog values as shown in Tab. 4 and in FIG. 12 for different colors according to the aforementioned equations (1) and (2) wherein the signals SR1, SB1 assume the same values as mentioned in Tab. 1.

TABLE 4

|        | Red     | Black  | Blue     | White |
|--------|---------|--------|----------|-------|
| S1(S2) | 1343 mV | −47 mV | −1114 mV | 91 mV |

Accordingly, a slicing level SL1 for digitizing the signal S1 is selected for example at −600 mV in the binary encoder 17 to obtain a digital blue signal S11 Also a slicing level SL2 for digitizing the signal S2 is selected for example at 600 mV in the other binary encoder 18 to obtain a digital red signal S21. Said digital signal S11 or S21 contains blue signal or red signal alone since said slicing levels SL1, SL2 are mutually independently selected.

On the other hand, the black signal is identified by amplifying the signal SR1 supplied from the voltage follower 15 by the amplifier 41 followed by digitizing by an independent binary encoder 42. By selecting the gain G5 of said amplifier 41 for example at 2.0, the image signal S3 supplied to the binary encoder 42 assume the values shown in Tab. 5 because of a relation S3=G5·SR1.

TABLE 5

| | Red | Black | Blue | White |
|---|---|---|---|---|
| S3 | 1340 mV | 260 mV | 760 mV | 2100 mV |

The digitization of the signal S3 in the binary encoder 42 is conducted with a slicing level selected for example at 1050 mV. Consequently the output digital signal S31 contains the black and blue information. The AND gate 48 receives said digital signal S31 and the digital blue signal S11 inverted by the inverter 46, thereby subtracting blue information from said signal S31 containing black and blue information, and thus providing a black signal BK.

It is therefore rendered possible to control the density or slicing levels independently for red, black and blue colors since a signal containing black and blue information is obtained from the image signal SR1 through an independent decoder, while the red and blue signals are obtained from the signals S1, S2 which are in turn obtained by analog processing of the image signals SR1, SB1. Consequently the present embodiment enables extremely easy density control for independent colors and is most suitable for an output device such as a color ink jet recorder.

As further shown in FIG. 11, the digital blue signal S11 released from the binary encoder 17 is supplied to the inverter 46 through the compressor 43 for noise reduction and the line thickening circuit 44 for pulse width expansion. This fact enables ensured erasure of the blue signal with a determined width from the binary signal S31, thus providing an exact black signal BK despite an eventual positional aberration in the photoelectric sensors 7, 8. As will be explained later, the compressor 43 comprises a principal scanning compressor 43A and an auxiliary scanning compressor 43B connected in series.

Said compressor 43 is designed to eliminate high-frequency components as noise, in order to utilize the blue signal for an image editing frame.

Figure 13:
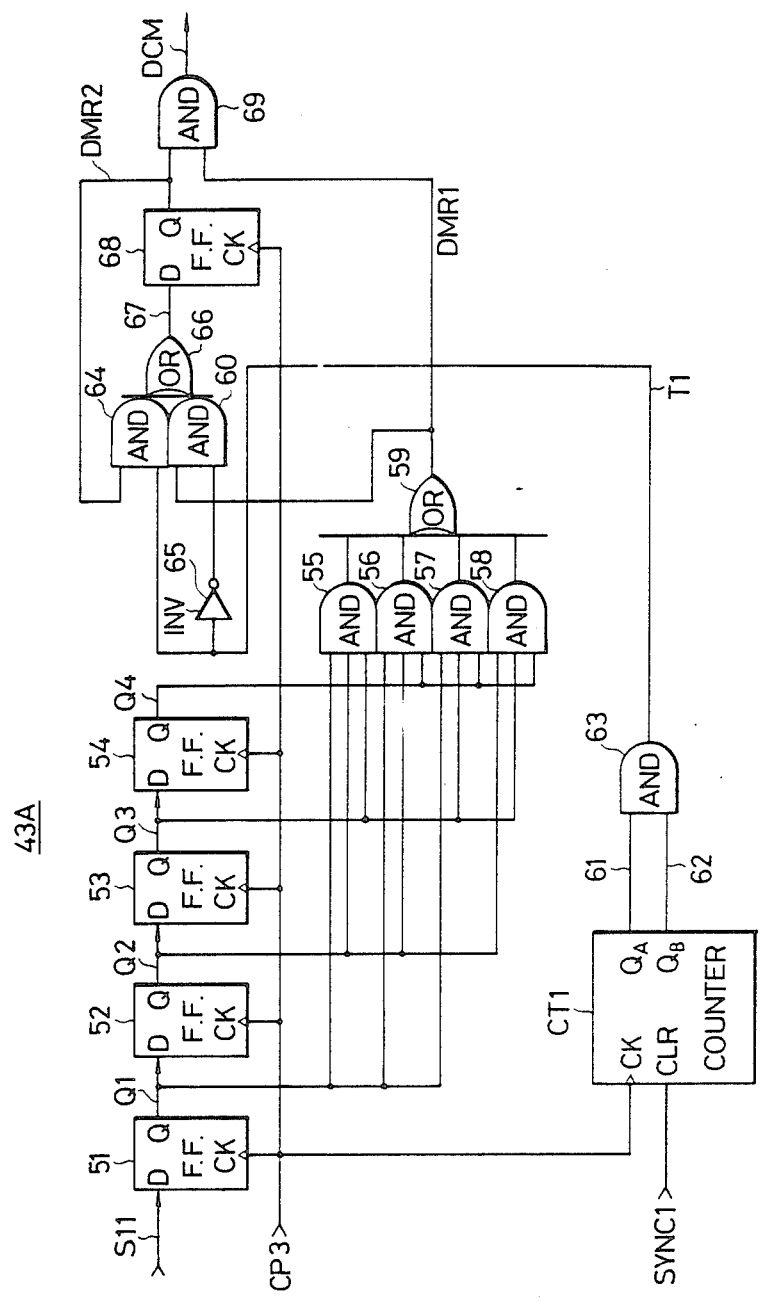
FIG. 13 is a block diagram showing an example of a principal scanning compressor to be employed in the circuit shown in FIG. 11.

FIG. 13 shows an example of the principal scanning compressor 43A in the compressor 43 shown in FIG. 11. In said compressor 43A provided are serially connected four flip-flops 51–54, and an AND gate 55 receives the output signals Q1, Q2 and Q3 from the flip-flops 51, 52 and 53. Similarly an AND gate 56 receives the output signals Q1, Q2 and Q4 from the flip-flops 51, 52 and 54, an AND gate 57 receives the output signals Q1, Q3 and Q4 from the flip-flops 51, 53 and 54, and an AND gate 58 receives the output signals Q2, Q3 and Q4 from the flip-flops 52, 53 and 54. An OR gate 59, receiving the output signals from said AND gates 55–58, supplies a logic signal DMR1 to AND gates 60 and 69.

A hexadecimal counter CT1 is reset by a synchronizing signal SYNC1 supplied to a clear port CLR thereof in synchronization with the reading function of the photoelectric sensors and starts to count clock pulses CP3 supplied to a clock port CK of said counter. Output ports QA, QB of said counter CT1 respectively supply a ½-frequency-divided signal 61 and a ¼-frequency-divided signal 62 to an AND gate 63, of which output signal T1 is supplied to an AND gate 64 and, after inversion by an inverter 65, to the other input port of the aforementioned AND gate 60. An OR gate 66, receiving the output signals from said AND gates 60, 64, supplies a logic sum signal 67 to the D input port of a flip-flop 68, which thus supplies a Q-output logic signal DMR2 to the other input ports of the AND gates 69, 64. In the above-explained principal scanning compressor 43A, a principal-scanning compressed signal DCM is obtained from the blue signal S11 by the supply of clock pulses CP3 to the flip-flops 51–54 and 68 and also to the counter CT1.

Figure 14:
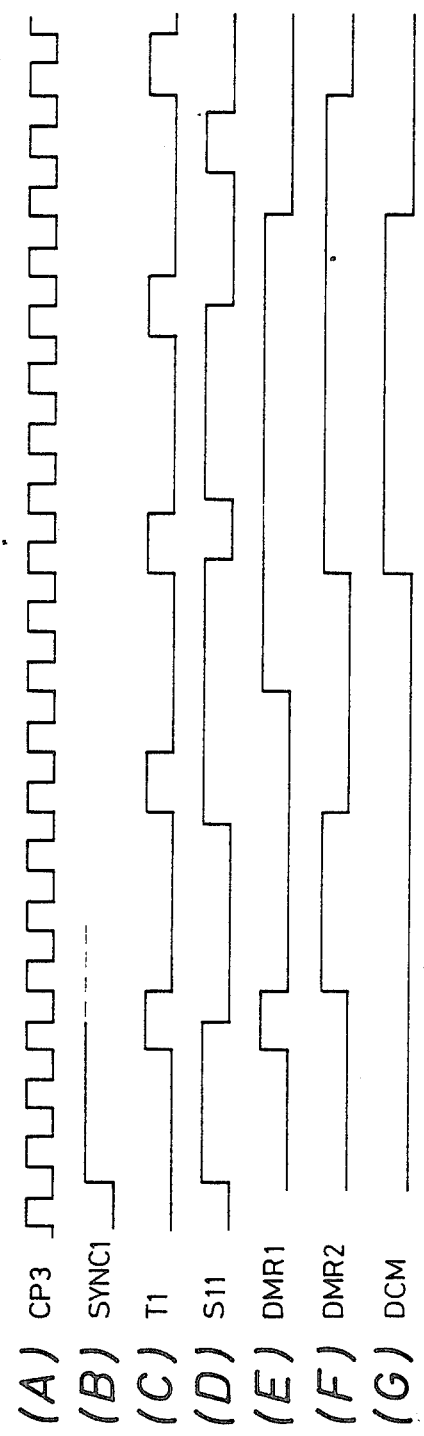
FIG. 14 is a waveform chart showing various signals in the circuit shown in FIG. 13.

FIG. 14 is a waveform chart showing various signals in the circuit shown in FIG. 13. Thus, in response to the blue signal S11 as shown in FIG. 14(D) and also in response to the clock pulses CP3 as shown in FIG. 14(A), there are obtained the signals T1, DMR1, DMR2 and DCM as shown in FIG. 14(C)–(G). In the circuit shown in FIG. 13, the AND gates 55–59 and the OR gate 59 constitute a ¾-majority decision logic circuit which considers that the signals are at the H-level in case three signals out of four are at the H-level. In this manner the present principal scanning compressor 43A compresses the data 1728 bits per scanning line into 216 bits corresponding to a compression of ⅛, thus providing a compressed signal DCM according to a 6/8 majority decision.

Figure 15:
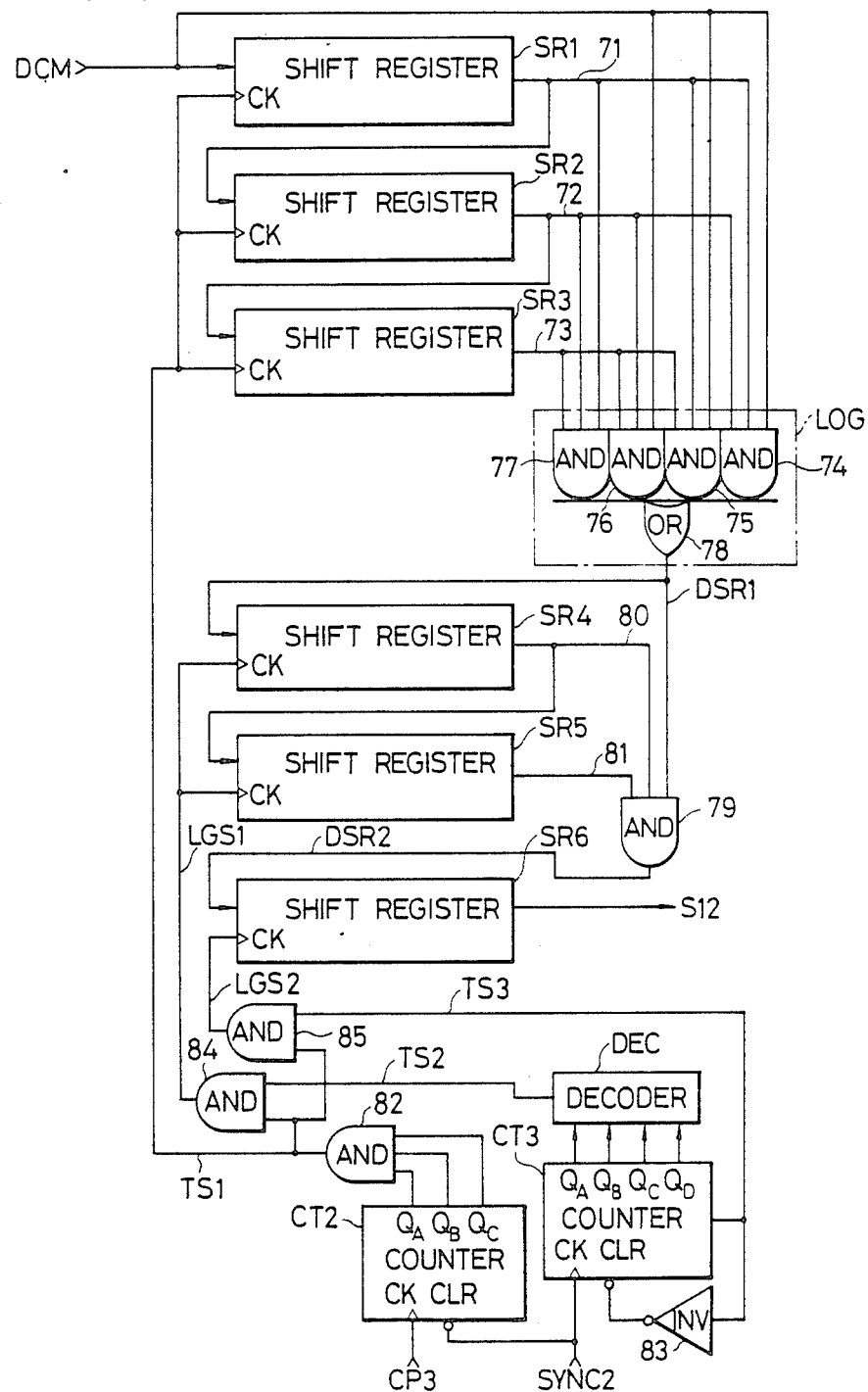
FIG. 15 is a block diagram showing an example of an auxiliary scanning compressor to be employed in the circuit shown in FIG. 11.

FIG. 15 shows an example of the auxiliary scanning compressor 43B of the compressor 43 shown in FIG. 11. The above-mentioned compressed signal DCM is supplied to a shift register SR1 of 215 bits, of which output signal 71 is in turn supplied a shift register SR2 of 216 bits, supplying the output signal to a shift register SR3 of 216 bits and thus obtaining a sequential output signal 73. Also said compressed signal DCM is supplied to AND gates 74, 75 and 76, while the output signal 71 from the shift register SR1 is supplied to AND gates 74, 75 and 77. Also the output signal 72 from the shift register SR2 is supplied to the AND gates 74, 76 and 77, and the output signal 73 from the shift register SR3 is supplied to the AND gates 75, 76 and 77. An OR gate 78, receiving the output signal from said AND gates 74–77, provides an output logic signal DSR1 to an AND gate 79 and also to a shift register SR4 of 216 bits, of which output signal 80 is supplied to an AND gate 79 and also to a shift register SR5 of 216 bits supplying an output signal 81 also to said AND gate 79. A logic product signal DSR2 from said AND gate 79 is supplied to a shift register SR6 constituting a part of a first line memory ML1, which provides a sampled auxiliary compressed signal S12.

A hexadecimal counter CT2 counts the clock pulses CP3 received through a clock port CK and supplies a ½-frequency-divided signal QA, a ¼-frequency-divided signal QB and a ⅛-frequency-divided signal QC to an AND gate 82 to obtain a timing signal TS1 as a logic product. Another hexadecimal counter CT3 counts the synchronizing signals SYNC2 received through a clock port CK of said counter to supply a ½frequency-divided signal QA, a ¼-frequency-divided signal QB, a ⅛-frequency-divided signal QC and a 1/16-frequency-divided signal QD to a decoder DEC, thus obtaining a second timing signal TS2. Also the count-up output signal from said hexadecimal counter CT3 is supplied through an inverter 83 to the clear port CLR of said counter to obtain a third timing signal TS3.

The first timing signal TS1 is supplied to the clock ports CK of said shift registers SR1, SR2 and SR3. Said first timing signal TS1 and the second timing signal TS2 are supplied to an AND gate 84, of which the output signal LGS1 is supplied to the clock ports of the shift registers SR4 and SR5. Furthermore the first and third timing signals TS1, TS3 are supplied to an AND gate 85, of which the output signal LGS2 is supplied to the clock port CK of a shift register SR6.

The clock pulse CP3 is generated at every bit for causing the principal scanning while the synchronizing signal SYNC2 is generated to advance the counter CT3 at every scanning line for controlling the auxiliary scanning. In response to such clock pulses CP3 and synchronizing signals SYNC2, the auxiliary scanning compressor 43B compresses the principal compressed signal DCM into a signal S12 with a bit compression ratio of 1/12. The logic circuit LOG composed of four AND gates 74-77 and OR gate 78 performs a bit compression of $\frac{1}{4}$ with a $\frac{3}{4}$-majority decision rule, giving an H-level logic output signal DSR1 when three signals out of the compressed signal DCM and the output signals 71, 72, 73 from the shift registers SR1, SR2, SR3 are at the H-level. Also the AND gate 79 constitutes a logic circuit for data compression with a compression ratio of $\frac{1}{3}$. Consequently the logic circuit LOG and said AND gate 79 in combination constitute a logic circuit with a 9/12-majority decision rule.

In this manner the auxiliary scanning compressor 43B provides an auxiliary compressed signal S12 according to a bulk processing of every 12 scanning lines.

Figure 16:
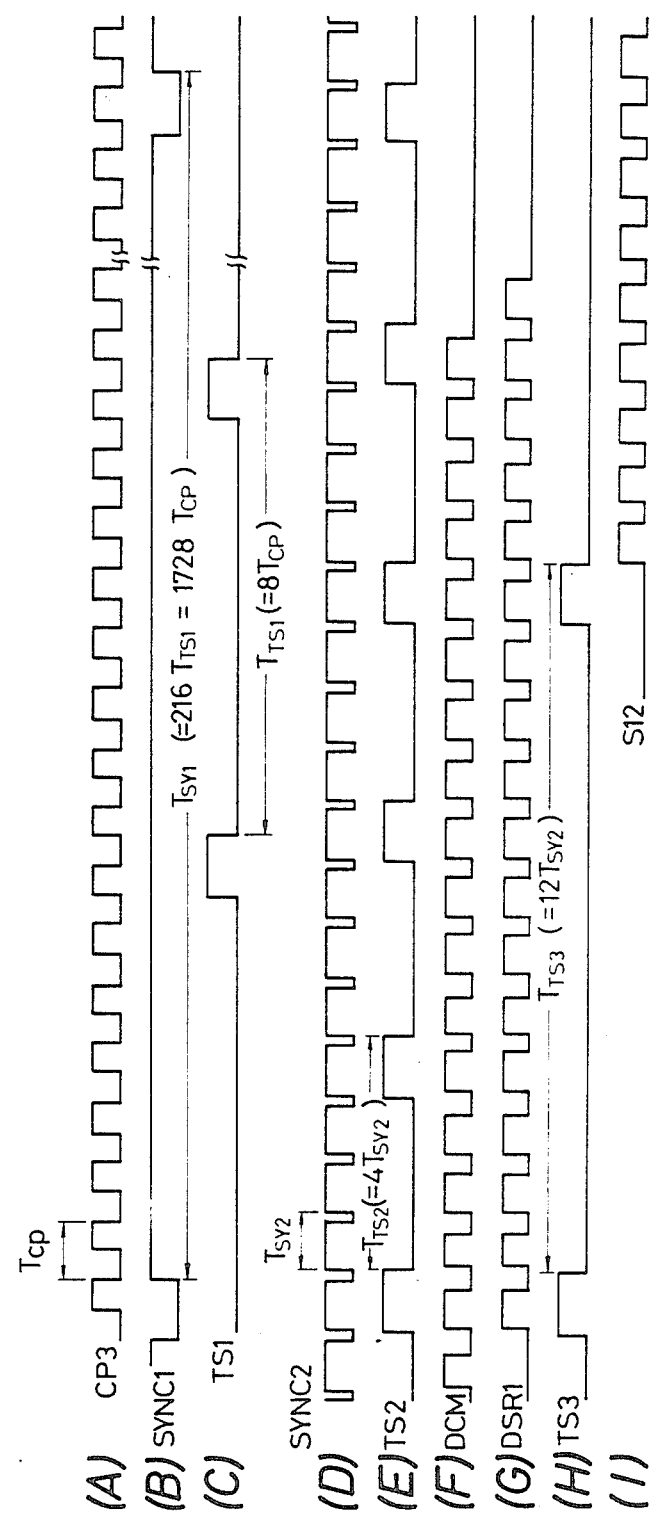
FIG. 16 is a waveform chart showing various signals in the circuit shown in FIG. 15.

FIG. 16 shows various signals appearing in the circuit shown in FIG. 15, wherein (A) and (B) relate to the counter CT2 while (C)-(I) relate to the counter CT3. Writing the period of the clock pulse CP at $T_{CP}$, the period $T_{SY1}$ of the synchronizing signal SYNC1 is represented as 1728 $T_{CP}$. Also writing the period of the cynchronizing signal SYNC2 as $T_{SY2}$, the periods $T_{TS1}$, $T_{TS2}$ and $T_{TS3}$ respectively of the first, second and third timing signals TS1, TS2, TS3 are represented as $8T_{CP}$, $4T_{SY2}$ and $12T_{SY2}$.

Figure 17:
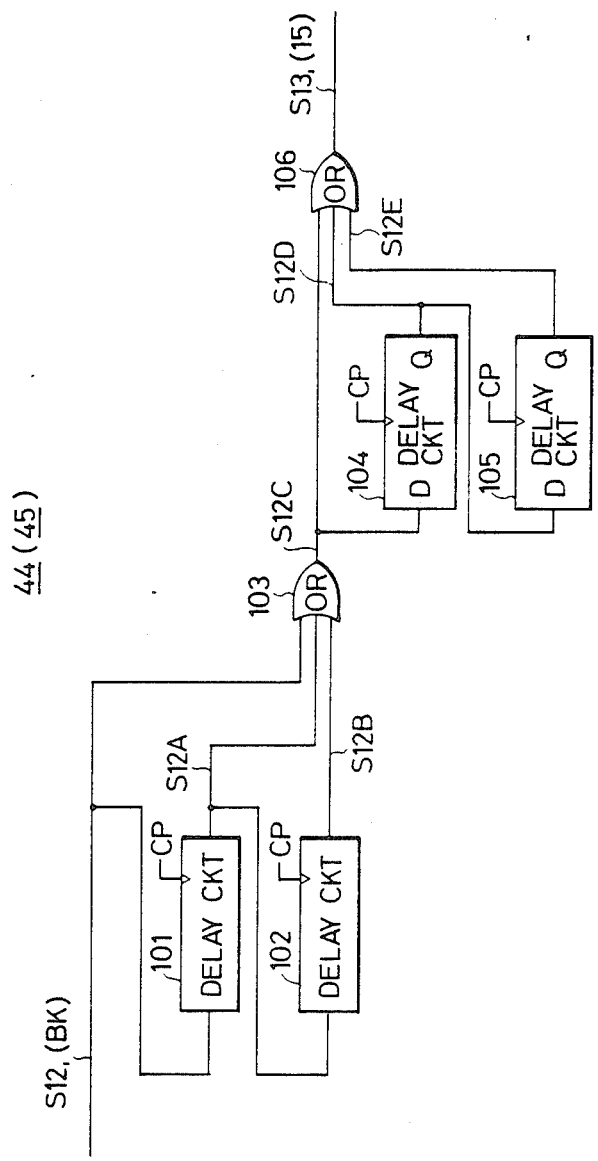
FIG. 17 is a block diagram of an example of a line thickening circuit shown in FIG. 11.

FIG. 17 shows an example of the line thickening circuit 44 shown in FIG. 11, wherein provided are a delaying circuit 101 for delaying the digital image signal S12 for one scanning line, a delaying circuit 102 for further delaying the signal S12A from said delaying circuit 102 for a period of one scanning line to obtain a signal S12B, and an OR gate 103 for making logic summation of said signals S12, S12A and S12B to obtain a signal S12C in which the number of pulses is increased in the direction of auxiliary scanning. The above-mentioned delaying circuits 101, 102 and the OR gate 103 achieve the line thickening in the auxiliary scanning direction.

There are also provided a delaying circuit 104, such as a D-type flip-flop, for delaying the output signal S12C from the OR gate 103 by a determined number of bits, for example one bit, per every clock pulse CP, a delaying circuit 105 such as a D-type flip-flop for further delaying the output signal S12D from said delaying circuit 104 by a determined number of bit, for example one bit, per every clock pulse CP, and an OR gate 106 for making logic summation of said signals S12C, S12D and the output signal S12E from said delaying circuit 105 to obtain a signal S13 in which the pulse width is increased in the principal scanning direction. Thus the above-mentioned delaying circuits 104 and 105, and the OR gate 106 perform the line thickening in the principal scanning direction.

Figure 18:
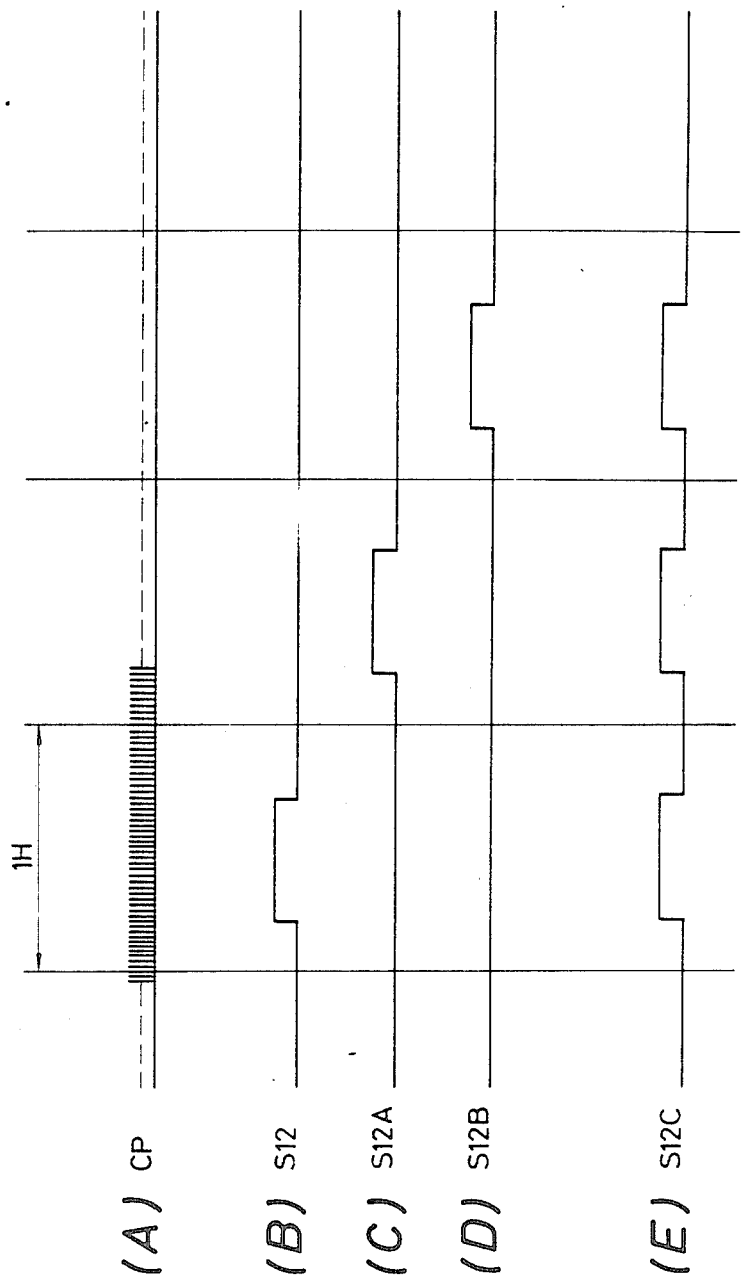
FIG. 18 is a waveform chart showing various signals in the circuit shown in FIG. 17.

FIG. 18 shows various signals relating to the line thickening in the auxiliary scanning direction in the circuit shown in FIG. 17. FIG. 18(A) shows an example of the blue signal S12 supplied from the suppressor 43. In response to the clock pulses shown in FIG. 18(A), said blue signal provides the signals S12A, S12B and S12C as respectively shown in FIG. 18(C), (D) and (E). In this manner the line is made thicker in the auxiliary scanning direction by increasing the pulses to three lines. The number of delaying circuits 101, 102 may be increased or decreased according to the desired line width.

Figure 19:
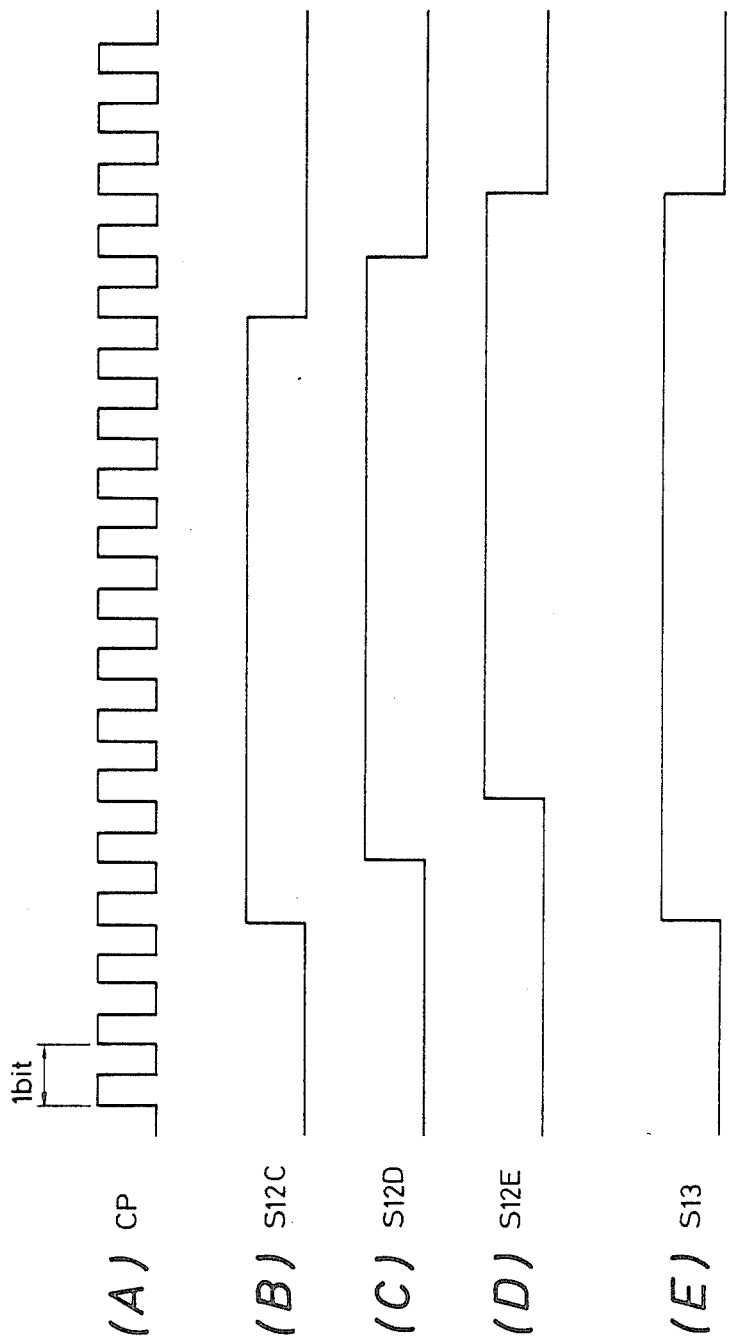
FIG. 19 is a waveform chart showing various signals also in the circuit shown in FIG. 17.

FIG. 19 shows various signals relating to the line thickening in the principal scanning direction in the circuit shown in FIG. 17. FIG. 19(B) shows an example of a signal pulse S12C supplied from the OR gate 103 after thickening in the auxiliary scanning direction. In response to the clock pulses CP shown in FIG. 19(A), the signal pulses S12D, S12E and S13 in FIG. 17 respectively assume the forms shown in FIG. 19(C), (D) and (E).

In this manner the line thickening circuit 44 shown in FIG. 11 provides a signal S13 which is thickened both in the auxiliary and principal scanning directions, i.e. of which pulse number and pulse duration are increased by determined amounts. Said signal S13 is supplied, after inversion by an inverter 46, to an AND gate 48 and is processed with the signal S31 containing blue and black information, thereby erasing the blue information and obtaining the black signal BK. Consequently the erasing blue signal is sufficiently widened to ensure secure subtraction of the blue signal, thereby enabling exact extraction of the black signal BK even in the presence of a positional aberration in the photoelectric sensors. In this manner it is rendered possible to completely avoid the conventional drawbacks of thinning of black lines or of disappearance of thin black lines.

Also as shown in FIG. 11, the black signal BK released from said AND gate 48 is supplied to a line thickening circuit 45 similar to the circuit 44 for line thickening in the principal and auxiliary scanning directions by expansion of the pulse number and pulse duration, and the thus expanded signal S15 is supplied, after inversion by an inverter 47, to an AND gate 49. Said AND gate 49 forms logic product of thus inverted signal S16 and a signal S21 supplied from the binary encoder 18 to inhibit the black signal in said signal S21, thereby providing the red signal R. Consequently the black signal eventually remaining in the red signal S21 released from said binary encoder 18 can be securely inhibited, and the red signal R can be exactly obtained even in the presence of a positional aberration of the photoelectric sensors. In this manner it is rendered possible to completely avoid the conventional drawbacks of thinning of red lines or disappearance of thin red lines.

Figure 20:
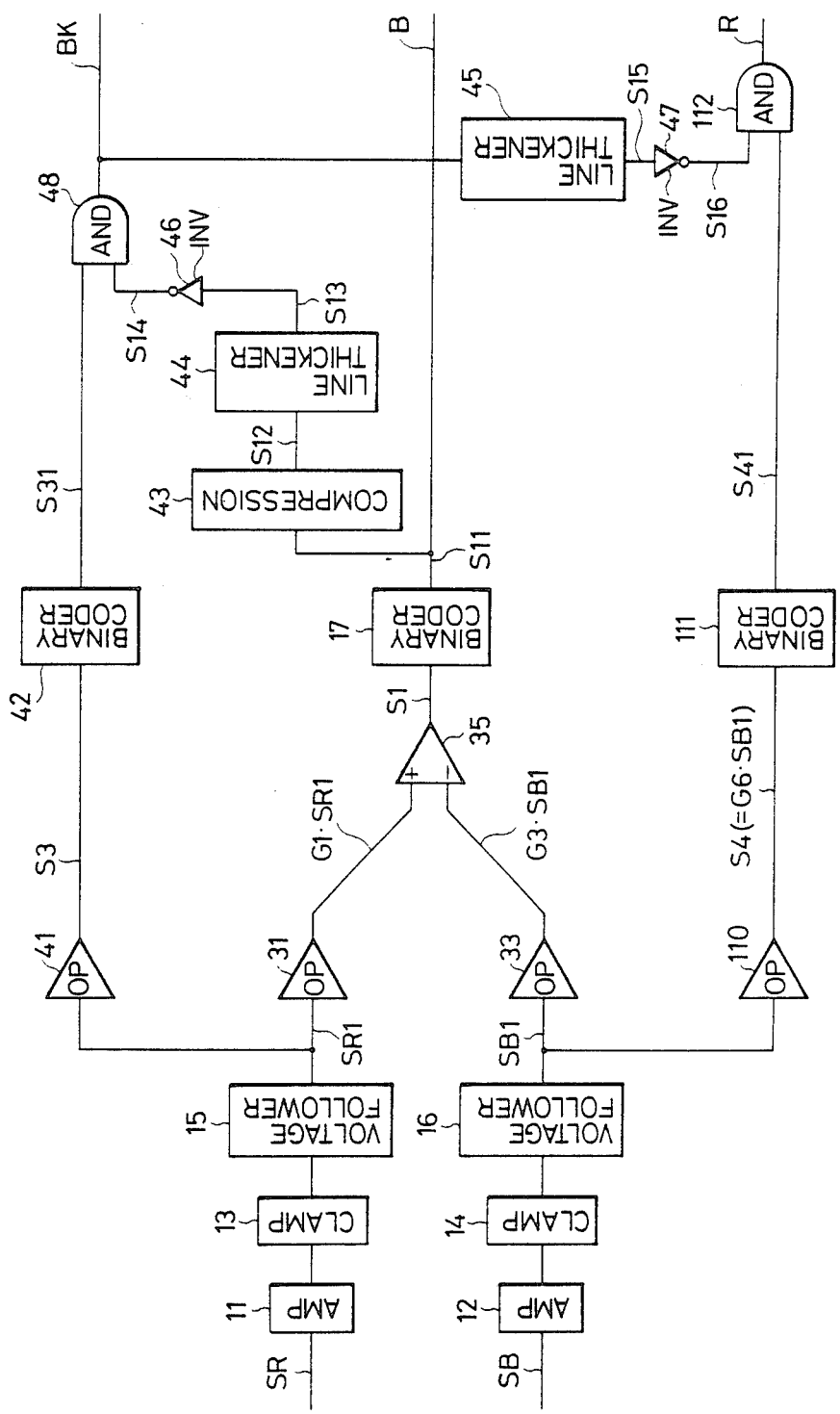
FIG. 20 is a block diagram of the color identifying circuit representing still another embodiment of the present invention.

FIG. 20 shows another embodiment of the color identifying circuit of the present invention, wherein are provided an amplifier 110 for amplifying the image signal SB1 supplied from the voltage follower 16, a binary encoder 111 for digitizing a signal S4 supplied from said amplifier 110, and an AND gate 112 for calculating a logic product of a signal S41 supplied from said binary encoder 111 and the signal S16 supplied from the inverter 47, thereby erasing the black signal from said signal S41 and obtaining the red signal R. Other components are similar to those in the first embodiment shown in FIG. 11 and are therefore not explained further.

The function of the present embodiment is different from that of the first embodiment in the following manner. The signal S4, obtained by amplitude amplification of the image signal SB1 by the amplifier 110, assume the values shown in Tab. 6, as calculated by an equation S4=G6·SB1 wherein G6 is the gain of said amplifier and is for example equal to 20.

TABLE 6

|  | Red | Black | Blue | White |
|---|---|---|---|---|
| S4 | 580 mV | 380 mV | 1960 mV | 2660 mV |

By digitizing said signal S4 in the binary encoder 111 with a slicing level for example at 1270 mV, the digital signal S41 supplied from said encoder 111 to the AND gate 112 contains red and black information. Said AND gate 112 also receives the signal S16 which is obtained from the black signal BK through the expansion of the pulse number and pulse duration in the line thickening circuit 45 and through the signal inversion by the inverter 47. It is therefore rendered possible to securely inhibit the black information in the digital signal S41 containing red and black information and to obtain the exact red signal R from the AND gate 112.

No particular requirement on the resolving power is imposed on the blue signal B obtained from the color identifying circuit in case said signal is used solely for defining the area of image editing. The inhibition of toner color information is unnecessary for this purpose, and the signal S11 supplied from the binary encoder 17 is therefore directly released as the blue signal B. Said signal is supplied to the line thickening circuit 44 through the compressor 43 for blue information inhibition for the same reason. On the other hand, the red signal R, requiring a high resolving power, is subjected to the black information inhibition without going through a compressor. In case the blue signal B is utilized for reproducing characters or patterns instead of the area defining, it is naturally preferable to erase other color information (for example black) in the same manner as is done in the color identification of the red signal R.

Figure 21:
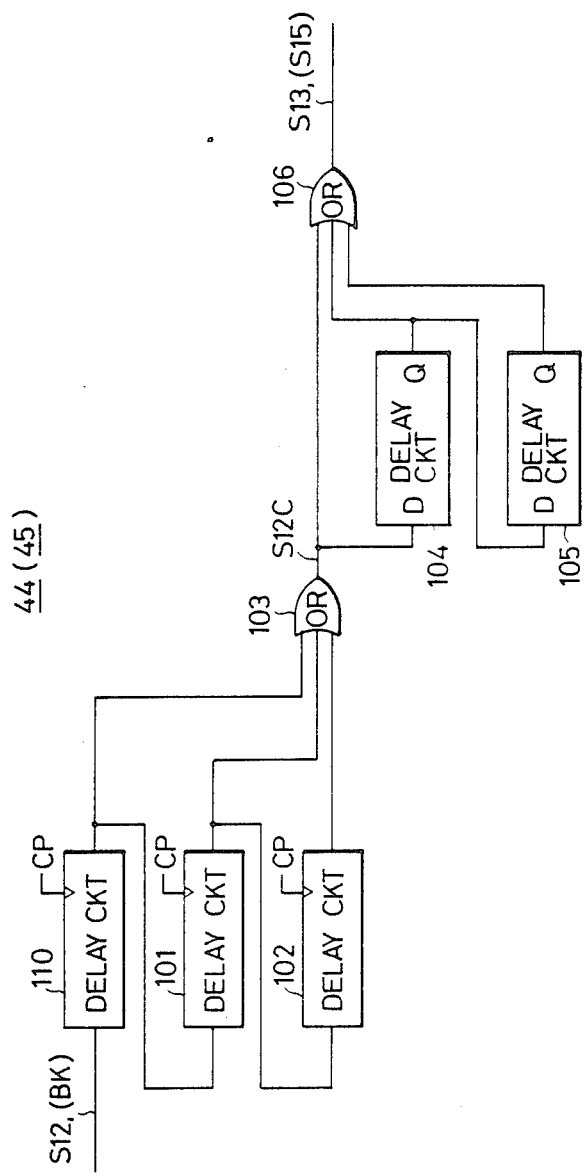
FIG. 21 is a block diagram another example of the line thickening circuit shown in FIG. 11 or FIG. 20.

FIG. 21 shows another example of the line thickening circuit 44 or 45, wherein provided is a delaying circuit 110 for delaying the digital signal S12 or BK for period of one scanning line. Other components are same as those already shown in FIG. 12. In the present example, the signal S12 or BK is supplied, through said delaying circuit 110, to other delaying circuits 101, 102 and the OR gate 103. Consequently the thickened signal S13 or S15 supplied from the OR gate 106 is delayed by a period of one scanning line with respect to the input signal S12 or BK and can therefore be synchronized with the input timing of the image recording device.

The line thickening circuits 44, 45 are merely provided for ensuring secure inhibition of particular color information, and it will be understood that certain inhibiting effect can be obtained even in the absence of such circuits.

As explained in the foregoing, the present invention allows more accurate color identification since it is based on the subtraction of a particular color signal, for example blue signal, from another color signal for example containing blue and black signals. The present invention also allows an image recording of a high image quality by utilizing the output signals of said color identification.

Furthermore the present invention allows to exactly inhibit a particular color since the color identification is carried out by expanding a particular color signal, for example blue signal, and by subtracting thus expanded signal from another color signal for example containing blue and black signals. It is therefore rendered possible to avoid the drawbacks of thinning of black lines or disappearance of thin black lines, and also to eliminate undesirable red toning in the edge portions of a black image area. In this manner the present invention provides image signals which are extremely faithful to the original image and which can be utilized for obtaining an image recording of a high image quality.

Furthermore, the present invention allows independent density control for example red, black, blue etc., since color identification is based on independent processing of plural colors, for example three colors, without common use of a decoder. For this reason it is made possible to regulate for example red signal for controlling the red density without affecting the identification of other colors. In this manner the present invention allows extremely easy independent color density control in combination with accurate color identification and is therefore suitably applicable to an output device such as a color ink jet recorder.

Although analog signal processing is employed in the foregoing embodiments of the color identifying circuit, it is naturally possible to utilize processing of digital signals of plural bits.

Also the foregoing embodiments are limited to the identification of red, black and blue, but it is also possible to identify other colors in combination with suitable color separating prisms or filters.

Furthermore two color separation signals are obtained from two charge-coupled devices in the foregoing embodiments, but said signals may be obtained from a single charge-coupled device in combination with switched filters.

Furthermore the charge-coupled devices may be replaced by other photoelectric sensors such as BBD's or imaging tubes, although there will be required a memory for storing the first color separation signal in such case.

What we claim is:

1. A multi-color image reading apparatus comprising:
photoelectric converting means for providing plural color separation signals corresponding to plural color-separated light beams from a multi-color image;
color identifying means for forming plural color signals, corresponding to colors of said multi-color image, from said plural color separation signals;
correcting means for correcting at least one of said color signals, said correcting means being adapted to utilize a color signal of a determined color for correcting other color signals; and
expanding means for expanding the color signal of said determined color, wherein the expanded color signal of said determined color is utilized for correcting other color signals.

2. A multi-color image reading apparatus according to claim 1, wherein the color signal of said determined color is utilized for erasing other color signals.

3. A multi-color image reading apparatus according to claim 1, wherein said other color signals are erased at level-changing points of the color signal of said determined color.

4. A multi-color image reading apparatus according to claim 1, wherein said expanding means comprises means for delaying the color signal of said determined color for a determined amount.

5. A multi-color image reading apparatus comprising:
photoelectric converting means for providing plural color separation signals corresponding to plural color-separated light beams from a multi-color image;
color identifying means for forming plural color signals corresponding to the colors of said multi-color image from said plural color separation signals;
delaying means for delaying one of said plural color signals formed by said color identifying means; and
correcting means for correcting at least one of said plural color signals, said correcting means responsive to the delayed color signal to erase an erroneous color signal formed by said color identifying means.

6. A multi-color image reading apparatus according to claim 5, wherein said correcting means is adapted to utilize a color signal of a determined color for correcting other color signals.

7. A multi-color image reading apparatus according to claim 5, wherein said correcting means erases an erroneous color signal that is formed at level-changing points of said at least one of said plural color signals.

* * * * *

UNITED STATES PATENT AND TRADEMARK OFFICE
CERTIFICATE OF CORRECTION

PATENT NO. : 4,694,502

DATED : September 15, 1987

INVENTOR(S) : KUNITAKA OZAWA, ET AL.

It is certified that error appears in the above-identified patent and that said Letters Patent is hereby corrected as shown below:

COLUMN 2

Line 28, "Tab. 1" should read --Table 1--.
    Line 28, delete "5,".
    Line 40, "Tab. 2" should read --Table 2--.

COLUMN 5

Line 31, "Tab. 3" should read --Table 3--.
    Line 39, "Tab. 3" should read --Table 3--.
    Line 39, "Tab. 1" should read --Table 1--.

COLUMN 6

Line 53, "Tab. 4" should read --Table 4--.
    Line 56, "Tab. 1" should read --Table 1--.

COLUMN 7

Line 10, "Tab. 5" should read --Table 5--.

COLUMN 9

Line 64, "bit," should read --bits,--.
    Line 65, "bit, per" should read --bits per--.

UNITED STATES PATENT AND TRADEMARK OFFICE
CERTIFICATE OF CORRECTION

PATENT NO. : 4,694,502
DATED : September 15, 1987
INVENTOR(S) : KUNITAKA OZAWA, ET AL.

It is certified that error appears in the above-identified patent and that said Letters Patent is hereby corrected as shown below:

COLUMN 11

Line 8, "Tab. 6," should read --Table 6,--.

COLUMN 13

Line 6, "amount" should read --amount of time--.

IN THE DRAWINGS

Sheet 7, Figure 9, "DECORDER" should read --DECODER--.
Sheet 8, Figure 11, "LINE THICKNER" should read --LINE THICKENER--.

Signed and Sealed this

Fifth Day of April, 1988

Attest:

DONALD J. QUIGG

Attesting Officer

Commissioner of Patents and Trademarks